United States Patent
Eriksson et al.

(10) Patent No.: US 6,219,418 B1
(45) Date of Patent: Apr. 17, 2001

(54) ADAPTIVE DUAL FILTER ECHO CANCELLATION METHOD

(75) Inventors: Anders Eriksson, Uppsala (SE); Johnny Karlsen, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/060,813

(22) Filed: Apr. 16, 1998

Related U.S. Application Data

(63) Continuation of application No. PCT/SE96/01317, filed on Oct. 16, 1996.

(30) Foreign Application Priority Data

Oct. 18, 1995 (SE) .................................................. 9503640

(51) Int. Cl.$^7$ .................................................. H04M 1/00
(52) U.S. Cl. .................................................. 379/407; 379/411
(58) Field of Search .......................... 370/286, 289–291; 379/388–390, 406–407, 409–411

(56) References Cited

U.S. PATENT DOCUMENTS

| | | | |
|---|---|---|---|
| 3,787,645 | 1/1974 | Ochiai et al. | 379/410 |
| 4,757,527 | 7/1988 | Beniston et al. | 379/410 |
| 4,903,247 | 2/1990 | Van Gerwen et al. | 379/411 |
| 5,428,605 | 6/1995 | André | 379/410 |
| 5,631,900 | * 5/1997 | McCaslin et al. | 379/407 |

FOREIGN PATENT DOCUMENTS

2164828 * 3/1986 (GB) .............................. N04B/3/23

OTHER PUBLICATIONS

Ochiai, Kazuo et al., "Echo Canceler with Two Echo Path Models", IEEE Transactions on Communications, v25, n6, p589–594, 1977.

* cited by examiner

Primary Examiner—Curtis Kuntz
Assistant Examiner—George Eng
(74) Attorney, Agent, or Firm—Burns, Doane, Swecker & Mathis, L.L.P.

(57) ABSTRACT

In a dual filter echo cancellation method, a new quality measure provides the basis for a new filter selection and transfer method. The quality measure represents the performance of a filter in the adaptive echo canceller. According to the method, a correlation measure between an echo containing signal and an echo estimation signal produced by the filter is estimated. A power measure of a residual signal, formed by the difference between the echo estimation signal and the echo containing signal, is estimated. The quality measure is calculated by dividing the estimated correlation measure by the estimated power measure. An adaptive filter and a programmable filter are used in the echo cancellation and the quality measures for both are calculated and compared. The best of the two filters, as determined by the quality measure, is used for modeling the echo path, and its filter coefficients are copied to the other filter.

12 Claims, 5 Drawing Sheets

ADAPTIVE DUAL FILTER ECHO CANCELLATION METHOD

This application is a continuation of International Application No. PCT/SE96/01317, which was filed on Oct. 16, 1996, which designated the United States, and which is expressly incorporated here by reference.

TECHNICAL FIELD

The present invention relates to an adaptive dual filter echo cancellation method and a method for determining a filter quality measure that is used in said echo cancellation method.

BACKGROUND

Echo is a problem related to the perceived speech quality in telephony systems with long delays, e.g. telephony over long distances or telephony systems using long processing delays, like digital cellular systems. The echo arises in the four-to-two wire conversion in the PSTN/subscriber interface. To remove this echo, echo cancellers are usually provided in transit exchanges for long distance traffic, and in-mobile services switching centers for cellular applications.

Due to the location of the echo canceller it is made adaptive; the same echo canceller is used for many different subscribers in the PSTN. This adaption is necessary not only between different calls, but also during each call, due to the non-fixed nature of the transmission network, e.g. phase slips, three-party calls, etc.

The adaption of the echo canceller needs to be controlled, since it must be inhibited during presence of near end side speech, otherwise the echo path estimate will be degraded. This leads to a conservative strategy with a well protected estimate. However, the adaption strategy cannot be too conservative, since this will degrade the performance of the echo canceller when a fast re-adaption is necessary due to a change in the echo path loop. To overcome the optimization problem, namely fast re-adaption when the echo path changes and stable echo estimate during double-talk, a configuration with two echo path estimates may be used. Echo cancellers using two filters for echo estimation have been described in K. Ochiai et al, "Echo Canceller with Two Echo Path Models", IEEE Transactions on Communications, 25 (6): 589–594, June 1977 and U.S. Pat. No. 3,787,645. One filter, commonly known as the foreground filter, is non-adaptive and used for obtaining the actual echo canceller output. The other filter, commonly known as the background filter, is continuously updated with some adaptive algorithm, typically a normalized least mean square (NLMS) algorithm. The coefficients from the adaptive background filter are then transferred to the foreground filter whenever the background filter is considered better in some sense.

Since the configuration described above only uses the non-adaptive foreground filter for echo canceller output, it is very important that the adaptive background filter is transferred when it performs better. However, due to problems, partly caused by the conservative algorithm that is used, this may not occur and echo cancellation may be inhibited.

SUMMARY

An object of the present invention is to provide a new method of determining a filter quality measure that may be used in selecting the best filter in a dual filter echo canceller.

A further object of the present invention is an adaptive dual filter echo cancellation method that is less conservative than the previously known method and avoids the problems of that method.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
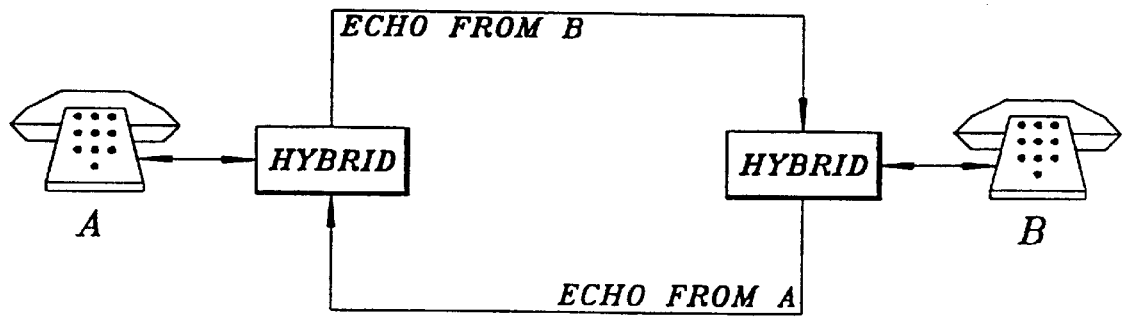
FIG. 1 is a block diagram of an echo generating system.

FIG. 1 illustrates the echo generating process in a telephony system. A subscriber A, called the far end subscriber below, is connected to a hybrid (a hybrid forms the interface between a four-wire and a two-wire connection, as is well known in the art) over a two-wire line. Similarly a subscriber B, called the near end subscriber below, is connected to another hybrid over a two-wire line. The two-wire lines transfer both incoming and outgoing speech signals. Outgoing speech from far end subscriber A is transferred to near end subscriber B over the upper two-wire line in FIG. 1. Similarly outgoing speech from near end subscriber B is transferred to far end subscriber A on the lower two-wire line in FIG. 1. However, the lower two-wire line from subscriber B to subscriber A also contains an echo of outgoing speech from subscriber A, which the hybrid at subscriber B was not able to suppress completely. Similarly the upper two-wire line in FIG. 1 contains echo from outgoing speech from subscriber B.

Figure 2:
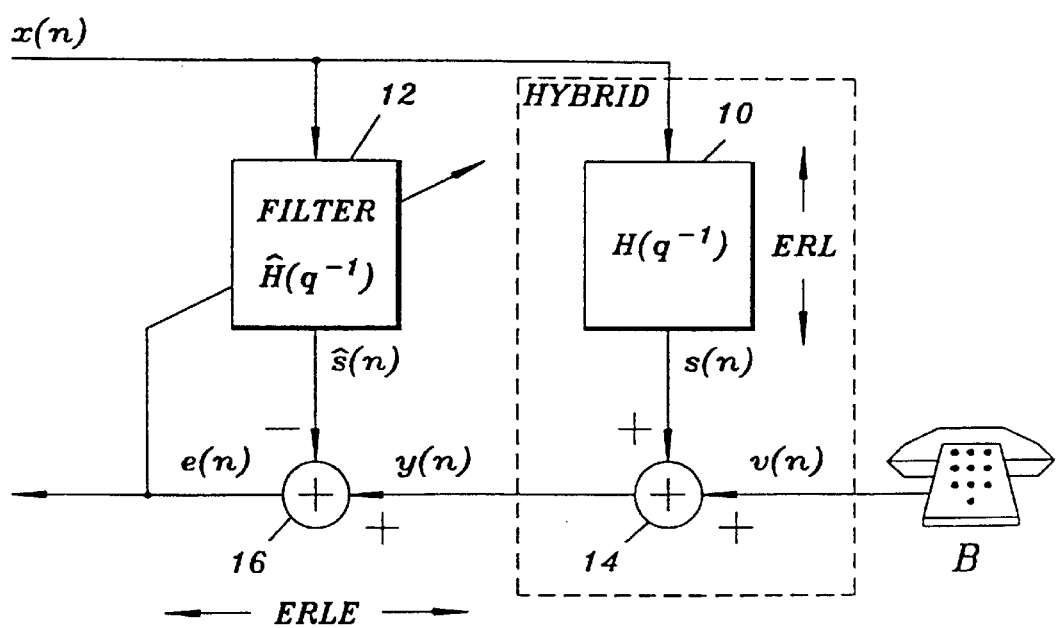
FIG. 2 is a block diagram of an echo cancellation system.

FIG. 2 illustrates how the echo back to subscriber A is cancelled at the near end side (a similar arrangement is provided at the far end side). Input signal x(n), where n denotes discrete time, represents speech from subscriber A. The input signal x(n) is attenuated by the hybrid, represented by a filter 10 with transfer function $H(q^{-1})$ and a summation unit 14, and the resulting echo signal s(n) is combined with the near end signal v(n), which may or may not contain near end speech, in summation unit 14. The attenuation of filter 10 is represented by the echo path attenuation ERL (ERL=Echo Return Loss). Thus, the resulting output signal y(n) contains both the near end signal and echo from the far end signal. Furthermore, input signal x(n) is also forwarded to an adaptive filter 12, which models the impulse response of the hybrid by adjusting its filter coefficients. The resulting estimate of echo signal s(n) is denoted $\hat{s}(n)$. This estimate is, in a summation unit 16, subtracted from output signal y(n) (ERLE=Echo Return Loss Enhancement represents the obtained improvement in echo attenuation), and the resulting error signal e(n) is forwarded to adaptive filter 12 for adjustment of the filter coefficients and to the two-wire line back to far end subscriber A.

A problem with the simple block diagram of FIG. 2 is that signal y(n) may contain, in addition to the echo signal s(n), a speech signal v(n) from subscriber B. This situation is called double-talk. During double-talk adaptive filter 12 will try to model not only the echo signal s(n) but also the speech signal v(n). Thus, the adaption of filter 12 must be controlled during double-talk.

Figure 3:
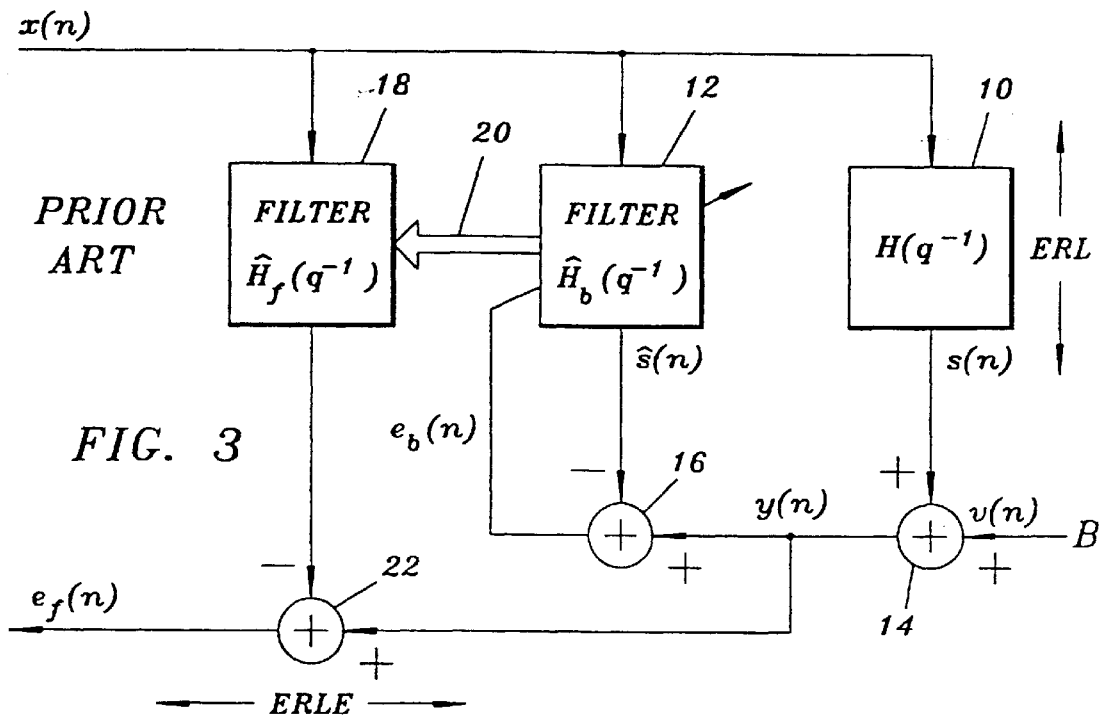
FIG. 3 is a block diagram of a previously known dual filter echo canceller.

FIG. 3 illustrates a block diagram of a dual filter echo canceller described in K. Ochiai and U.S. Pat. No. 3,787,645 intended to solve this double-talk problem. Adaptive filter 12 is continuously updated whether there is double-talk or not. However, in this case the output from summation unit 16 is only forwarded to adaptive filter 12 and not to the two-wire line back to far end subscriber A. Instead the actual echo cancellation is performed by a programmable foreground filter 18, which forwards an echo estimate to a summation unit 22, which forwards a resulting error signal $e_f(n)$ to the two-wire line back to far end subscriber A. The coefficients from the adaptive background filter 12 are transferred to the programmable foreground filter 18 whenever the adaptive background filter 12 is considered better than the programmable foreground filter 18. This usually occurs when there is no double-talk. During double-talk the coefficients that were transferred to the programmable foreground filter 18 just before the double-talk situation occurred are kept for echo cancellation during the double-talk period. Once the double-talk situation no longer exists and the adaptive background filter 12 is determined to give better performance, filter coefficients are once again transferred from filter 12 to filter 18.

The method to compare the performance of the two filters described in the afore-mentioned documents may be summarized as follows. The main idea is to compare the residual energy from the two filters. Thus, filter coefficients are transferred only if $$E|e_b(n)| < \mu \cdot E|e_f(n)| \tag{1}$$

where E(.) denotes estimated residual energy level and $\mu$ is a constant, which is chosen to ⅛ in [1]. In order to make this algorithm perform well the following two requirements are necessary $$E|e_b(n)| < \lambda \cdot E|y(n)| \tag{2}$$

$$E|y(n)| < E|x(n)| \tag{3}$$

where $\lambda$ is a constant, which in [1] equals ⅛ (corresponding to −18 dB). If the above three conditions are fulfilled the filter coefficients of filter 12 are transferred to filter 18.

Equation (1) above means that the residual echo energy level from the background filter 12 should be lower (by a factor $\mu$) than the residual energy from the foreground filter 18. Condition (2) means that the echo return loss enhancement (ERLE) must have reached a predetermined threshold of $-20 \log \lambda$ dB. Condition (3) means that there should not be an obvious double-talk situation (if y(n) has more energy than x(n) it must contain something in addition to the echo signal s(n), namely near end speech). As a further condition it may be required that the above three conditions are simultaneously fulfilled for a predetermined time period, for example 48 ms.

Since the configuration of K. Ochiai and U.S. Pat. No. 3,787,645 only uses the programmable foreground filter 18 for actual echo cancellation, it is very is important that the adaptive filter 12 is always transferred when it performs better. However, due to the problems stated below this may not always occur.

One problem occurs if the near end side has a high background noise level. In this case the residual echo $e_f(n)$ will be buried in noise. This means that condition (1) above becomes blind; no incentive is given to transfer the background filter to the foreground filter.

Another problem is that condition (2) requires that the echo return loss enhancement ERLE should have reached 18 dB before any transfer of the background filter can take place. However, this situation may never be achieved if the background noise level is high and the echo return loss (ERL) is also high.

A further problem is that the ERLE requirement of 18 dB may never be fulfilled if the echo path has a high degree of non-linearity.

Since the adaptive filter 12 of K. Ochiai and U.S. Pat. No. 3,787,645 is allowed to adapt continuously it will diverge from its optimum during double-talk.

This divergence is not restored, which means that the adaptive filter needs a new convergence period after every double-talk situation before it reaches the same performance as the program-able filter. This implies that the convergence process of the echo canceller will become very inefficient in a fast alternating duplex situation.

Figure 4:
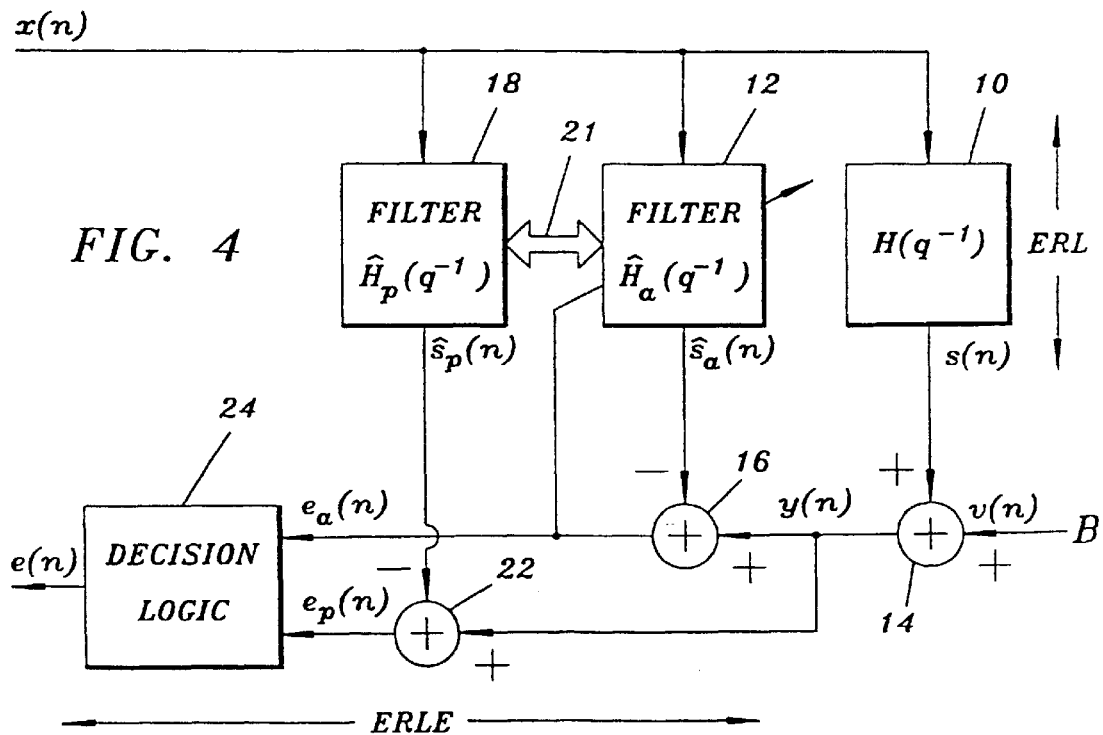
FIG. 4 is a block diagram of a dual filter echo canceller operating in accordance with the echo cancellation method of the present invention.

FIG. 4 illustrates an echo canceller using the method of the present invention. In the echo canceller of FIG. 4 filter 12 is an adaptive filter and filter 18 is a programmable filter, as in the prior art echo canceller of FIG. 3. However, in the echo canceller of FIG. 4 the two filters are used completely in parallel, i.e. residual signals $e_a(n)$ and $e_p(n)$ are obtained for both filters, and a decision logic 24 decides which signal to choose as the actual output signal e(n). Furthermore, as indicated by double arrow 21, both filters may be transferred or copied.

In accordance with the present invention decision logic 24 uses the quality measure $$q_i = \frac{E\hat{s}_i(n)y(n)}{Ee_i^2(n)} \tag{4}$$

where i=a,p, to decide which residue signal $e_a(n)$ or $e_p(n)$ to use as the actual output signal. This choice of quality measure will now be explained.

Consider the signal $$y(n)=s(n)+v(n) \tag{5}$$

where s(n) represents the echo signal and v(n) represents near-end noise and speech. From (5) it can be seen that the numerator of (4) is a correlation between the estimated echo and the true echo, with near-end speech and noise added. This correlation will be high if the filter is well adjusted to the echo path. Since $\hat{s}_i(n)$ is independent of v(n), the numerator of $q_i$ will not vanish when the background noise level is high. However, since $Ee_i^2(n)$ is used as the denominator, $q_i$ will decrease in the presence of near-end speech or noise. Thus, a convenient condition for decision logic 24 to select residual signal $e_a(n)$ as the "best" signal, is to require that $$q_a > A q_p + B \tag{6}$$

is fulfilled. Here A is a predetermined factor and B is a predetermined offset.

To avoid selecting the adaptive filter during an obvious double-talk situation, it may also be required that the following condition is fulfilled $$q_a > COR[Ey^2(n) < \alpha \cdot NL\ AND\ q_a > B] \quad (7)$$

before the adaptive filter is selected as the best filter. Here C represents an offset which is greater than offset B. Furthermore, $\alpha$ is a factor and NL is the measured noise level.

Figure 5:
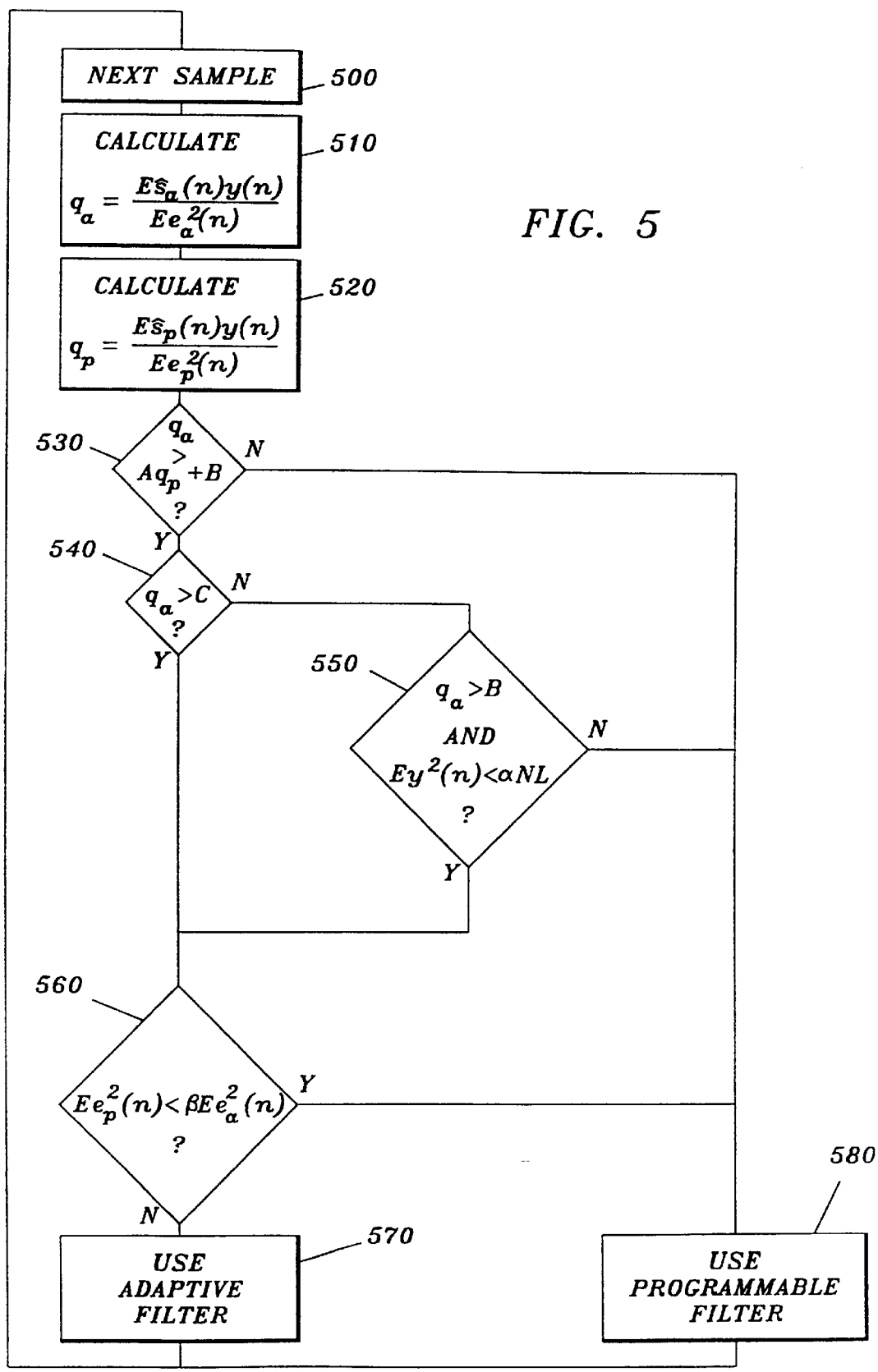
FIG. 5. is a flow chart illustrating an embodiment of the dual filter echo cancellation method in accordance with the present invention.

FIG. 5 illustrates an embodiment of the method in accordance with the present invention in which the quality measure (4) is used to determine the best filter. In step 500 the next sample is used to calculate new quality measures in steps 510 and 520. Step 530 performs the test in accordance with condition (6). If condition (6) is fulfilled, step 540 tests the first part of condition (7). If this test fails the alternative branch 550 including the second part of condition (7) is tested. If either of tests 540, 550 is successful the algorithm proceeds to step 560. This step tests whether the following condition is fulfilled $$Ee_p^2(n) < \beta \cdot Ee_a^2(n) \quad (8)$$

where $\beta$ is a predetermined factor. This step tests whether the programmable filter has a lower residual signal energy than the adaptive filter. If this is not the case the adaptive filter is selected as the output filter, and this filter is used to produce the actual output signal e(n). On the other hand, if test 560 indicates that the programmable filter actually has a smaller residual signal energy, this filter will be used to produce the output signal in step 580. Similarly the programmable filter will be used if the test in step 530 fails and if both tests 540 and 550 fail.

In an exemplary embodiment of the method illustrated in FIG. 5, the following values have been used for the various predetermined constants.

A=2
B=0
C=1
$\alpha$=10
$\beta$=1

With these values it may be seen that condition (6) is less conservative than the conditions in K. Ochiai and U.S. Pat. No. 3,787,645. For example, C=1 implies that in the stationary case ERLE should be higher than 0 dB. This is much lower than the value 18 dB in [1, 2]. This condition is further relaxed to $q_a > 0$ when $Ey^2(n)$ falls below the noise level.

Figure 6:
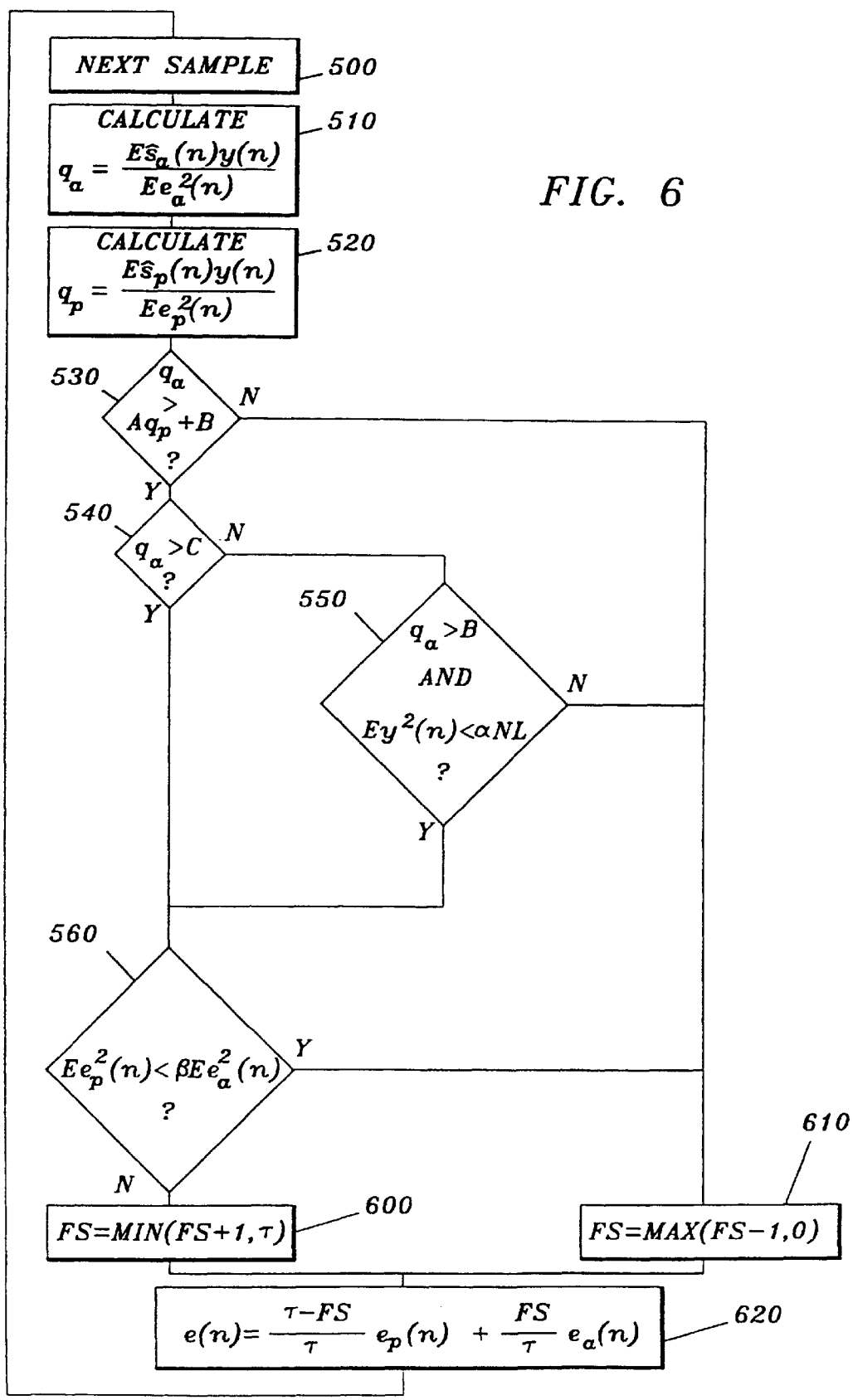
FIG. 6 is an exemplary embodiment of the dual filter echo cancellation method in accordance with the present invention.

FIG. 6 illustrates an exemplary embodiment of the method in accordance with the present invention. In this embodiment steps 500–560 are the same as in the embodiment of FIG. 5. However, instead of using the selected filter directly to produce an output signal, this embodiment makes a smooth transition from one filter to the other by linearly combining the residual signals from the two filters in accordance with step 620. Each time the adaptive filter is chosen as the best filter, a filter state variable FS is increased in accordance with step 600. Similarly, each time the programmable filter is selected as the best filter, filter state variable FS is decreased in accordance with step 610. The calculated filter state variable FS is then used in step 620 to form a linear combination between residual signals $e_a(n)$ and $e_p(n)$. Here the variable $\pi$ represents a transition time, for example 128 sample periods. As can be seen from step 620 the proportion of a selected filter will increase while the proportion of a non-selected filter will decrease. When a filter has been consistently selected for $\pi$ sample periods the smooth transition has been completed.

Step 620 performs a linear combination of $e_p(n)$ and $e_a(n)$. However, this is not absolutely necessary. For example, it is also possible to use non-linear weighting factors, although the linear combination is probably optimal.

An embodiment of the method illustrated in FIG. 6 uses the same values for the predetermined constants A, B, C, $\alpha$, $\beta$ as the embodiment of FIG. 5.

The methods illustrated in FIGS. 4 and 5 are concerned with selecting and using the proper filter for producing the actual output signal e(n). However, as indicated by the double arrow 21 in FIG. 4 each filter may also be transferred or copied to the other filter. For example, if the adaptive filter is consistently better than the programmable filter, it may be prefaerable to copy the coefficients of the adaptive filter to the programmable filter. On the other hand, after a double-talk situation, in which the adaptive filter has diverged, it is probably a good idea to transfer the coefficients from the programmable filter to the adaptive filter, since the estimated echo of the programmable filter is probably better than the echo estimate of the diverged adaptive filter (the estimated echo before the double-talk situation is probably a good starting point for an adaption to a new echo estimate after the double-talk situation).

Figure 7:
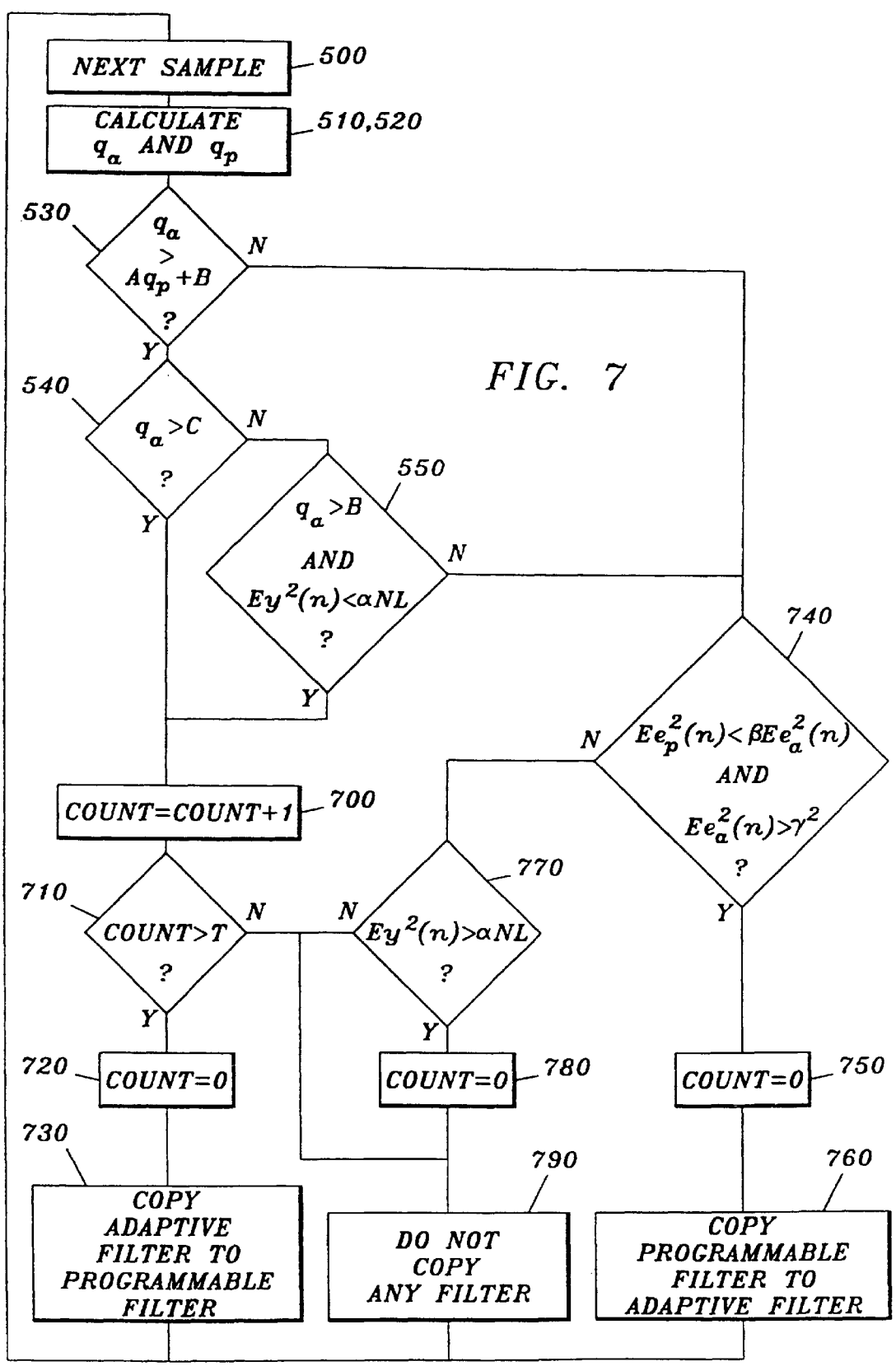
FIG. 7 is another exemplary embodiment of the dual filter echo cancellation method in accordance with the present invention.

FIG. 7 illustrates an exemplary embodiment of a method for transferring filter coefficients from one filter to the other which is based on the same algorithm as the filter selection methods of FIGS. 5 and 6. Thus, steps 500–550 are the same as in FIGS. 5 and 6. If the adaptive filter has been selected as the best filter a counter COUNT is incremented in step 700. Step 710 tests whether COUNT exceeds a predetermined constant T (for example 2 047). If COUNT exceeds T, this means that the adaptive filter has been selected T times. Therefore the adaptive filter is copied to the programmable filter (step 730) and the counter COUNT is reset to zero (step 720). Thus, if the adaptable filter is consistently selected it will be transferred to the programmable filter.

On the other hand, if the programmable filter has been selected as the most appropriate filter, step 740 tests whether the following two conditions are both fulfilled $$Ee_p^2(n) < \beta \cdot Ee_a^2(n)\ AND\ Ee_a^2(n) > \gamma^2 \quad (9)$$

These conditions imply that the adaptive filter performs significantly worse (controlled by the factor $\beta$) than the programmable filter and that the residual energy must exceed a certain threshold $\gamma^2$ to avoid taking decisions on low non-significant energy levels. Suitable values are $\beta=\frac{1}{2}$ and $\gamma=-40$ dBm0. If step 740 is successful the programmable filter is copied to the adaptive filter (step 760) and counter COUNT is reset to zero (step 750).

The two situations described so far are the situations in which filter coefficients are actually copied. However, if test 710 fails the algorithm will proceed to step 790, which implies that no filter coefficients are copied. This occurs when the variable count has not yet reached the value T.

Another situation in which no filter coefficients are copied is when test 740 fails. In this situation the algorithm proceeds to step 770. Step 770 tests whether the following condition $$Ey^2(n) > \alpha \cdot NL \quad (10)$$

is fulfilled. Thus, step 770 tests whether signal y(n) exceeds the noise level. If this is the case there probably is a double-talk situation, since signal y(n) probably contains speech and the adaptive filter does not perform significantly better than the programmable filter. Consequently the variable COUNT is reset to zero in step 780 to indicate that this is certainly not the time to transfer the adaptive filter to the programmable filter. On the other hand, since step 740 failed, the programmable filter is not significantly better than the adaptive filter. Thus, none of the filters is transferred (step 790).

Finally, if step 770 fails, this indicates that no decisions can be made, and things are left as they are (no filter is copied, COUNT is not changed).

In an exemplary embodiment of the method illustrated in FIG. 7 the following constants are used:

A=1
B=0,125
C=1
α=10
β=½
γ²=−40 dBm0

It will be understood by those skilled in the art that various modifications and changes may be made to the present invention without departure from the spirit and scope thereof, which is defined by the appended claims.

What is claimed is:

1. A method of determining a quality measure representing performance of a filter in an adaptive echo canceller, comprising the steps of:
    estimating a correlation measure between an echo containing signal and an echo estimation signal produced by said filter;
    estimating a power measure of a residual signal formed by the difference between said echo estimation signal and said echo containing signal; and
    calculating said quality measure by dividing said estimated correlation measure by said estimated power measure, to form a quality measure represented by the following equation:

$$q_{INVENTION} = \frac{E[\hat{s}_i(n)y(n)]}{E[e_i(n)^2]}.$$

2. The method of claim 1, wherein said echo containing signal may contain, in addition to echo, noise and speech signals produced near said echo canceller.

3. An adaptive dual filter echo cancellation method in which an adaptive filter and a programmable filter are both used for estimating an echo signal, comprising the steps of:
    estimating a first correlation measure between an echo containing signal and an adaptive filter echo estimation signal;
    estimating a first power measure of a first residual signal formed by the difference between said adaptive filter echo estimation signal and said echo containing signal;
    determining an adaptive filter quality measure by dividing said estimated first correlation measure by said estimated first power measure;
    estimating a second correlation measure between said echo containing signal and a programmable filter echo estimation signal;
    estimating a second power measure of a second residual signal formed by the difference between said programmable filter echo estimation signal and said echo containing signal;
    determining a programmable filter quality measure by dividing said estimated second correlation measure by said estimated second power measure; and
    comparing said adaptive filter quality measure to said programmable filter quality measure for determining whether said adaptive filter or said programmable filter gives the best estimate of said echo signal.

4. The method of claim 3, further comprising the steps of:
    selecting said adaptive filter as the filter that gives the best estimate of said echo signal only if the following condition is fulfilled:
        (i) said adaptive filter quality measure exceeds the sum of a first predetermined offset and the product of said programmable filter quality measure and a predetermined first factor; and
    selecting said programmable filter as the filter that gives the best estimate of said echo signal if the condition (i) is not fulfilled.

5. The method of claim 4, further comprising the step of:
    selecting said adaptive filter as the filter that gives the best estimate of said echo signal only if at least one of the following further conditions is fulfilled:
        (ii) said adaptive filter quality measure is greater than a second predetermined offset, which is greater than said first predetermined offset, and
        (iii) said adaptive filter quality measure is greater than said first predetermined offset, and an estimated third power measure of said echo containing signal is less than the product of a measured noise level and a second predetermined factor; and
    selecting said programmable filter as the filter that gives the best estimate of said echo signal if neither of conditions (ii) and (iii) is fulfilled.

6. The method of claim 5, further comprising the steps of:
    selecting said adaptive filter as the filter that gives the best estimate of said echo signal only if the following further condition is not fulfilled:
        (iv) said estimated second power measure is less than the product of said estimated first power measure and a third predetermined factor; and
    selecting said programmable filter as the filter that gives the best estimate of said echo signal if condition (iv) is fulfilled.

7. The method of claim 4, further comprising the step of using the selected filter for estimating said echo signal.

8. The method of claim 4, further comprising the step of combining said first and second residual signals, increasing the proportion of the residual signal that corresponds to the selected filter and decreasing the proportion of the residual signal that corresponds to the non-selected filter.

9. The method of claim 7, wherein said first predetermined factor equals 2, said first predetermined offset equals 0, and said second predetermined offset equals 1.

10. The method of claim 5, further comprising the steps of:
    copying said programmable filter to said adaptable filter if said programmable filter has been selected and the following conditions are both fulfilled:
        (iv) said estimated second power measure is less than the product of said estimated first power measure and a third predetermined factor, and
        (v) said estimated first power measure is greater than a predetermined constant.

11. The method of claim 10, further comprising the steps of:
    counting each time said adaptable filter has been selected; and
    copying said adaptive filter to said programmable filter when said adaptable filter has been selected a predetermined number of times.

12. The method of claim 11, wherein said first predetermined factor equals 1, said first predetermined offset equals 0.125 and said second predetermined offset equals 1.

* * * * *